United States Patent [19]

St. Clair et al.

[11] 4,286,077

[45] Aug. 25, 1981

[54] WEATHER RESISTANT ADHESIVE COMPOSITION

[75] Inventors: David J. St. Clair; Earle E. Ewins, both of Houston, Tex.

[73] Assignee: Shell Oil Company, Houston, Tex.

[21] Appl. No.: 142,312

[22] Filed: Apr. 21, 1980

[51] Int. Cl.$^3$ ............................................ C08F 279/02
[52] U.S. Cl. ................................ 525/232; 260/29.1 R; 260/33.6 R; 260/33.6 UA; 525/237; 525/338; 525/339
[58] Field of Search ............... 525/339, 232, 338, 237; 260/29.1 R, 33.6 R, 33.6 UA

[56] References Cited

U.S. PATENT DOCUMENTS

| | | |
|---|---|---|
| 3,239,478 | 3/1966 | Harlan ..................................... 260/27 |
| 3,766,295 | 10/1973 | Crossland et al. .................... 525/339 |
| 3,917,607 | 11/1975 | Crossland et al. ............... 260/28.5 B |
| 3,937,760 | 2/1976 | Cole et al. ............................ 525/339 |
| 4,097,434 | 6/1978 | Coker .................................. 260/23.3 |
| 4,141,876 | 2/1979 | Hansen ......................... 260/33.6 UA |

FOREIGN PATENT DOCUMENTS 45-17075  12/1970  Japan ....................................... 525/232

*Primary Examiner*—William F. Hamrock
*Attorney, Agent, or Firm*—Dean F. Vance

[57] ABSTRACT

A weather resistant adhesive composition possessing an excellent balance of properties including good tack and low melt viscosity comprises a selectively hydrogenated monoalkenyl arene/conjugated diene block copolymer component having certain block molecular weights, tackifying resin, and plasticizer.

13 Claims, No Drawings

WEATHER RESISTANT ADHESIVE COMPOSITION

Block copolymers have been increasingly employed in adhesive compositions because of their high cohesive strengths and their ability to "cross-link" without a chemical vulcanization step. These block copolymers, such as those described in Harlan, U.S. Pat. No. 3,239,478, are primarily either linear or radial styrene-butadiene or styrene-isoprene block copolymers. Improved oxidative resistant adhesives are also available based on selectively hydrogenated styrene-diene block copolymers, such as those block copolymers disclosed in U.S. Pat. No. 3,239,478, U.S. Pat. No. 3,917,607, U.S. Pat. No. 4,097,434 and U.S. Pat. No. 4,141,876.

Weather resistant tapes and labels are a special class of pressure sensitive adhesive (PSA) products. Any PSA must meet the tack, holding power, service temperature and processability requirements for its intended application. Weather resistant PSA must not only meet these requirements but in addition must be resistant to degradation by oxygen, ozone and ultraviolet light under long term exposure at ambient conditions. The market for weather resistant PSA products has traditionally been filled by solvent coated acrylic adhesives.

Because of the environmental and economic pressures being placed on the solvent coating process, the need is great for a weather resistant adhesive which can be processed as a solvent free hot melt pressure sensitive adhesive (HMPSA). As discussed in the embodiments, no materials are available commercially today which fully meet the requirements for a weather resistant HMPSA. The widely used HMPSA based on the unsaturated thermoplastic rubbers are unsuitable for use as weather resistant adhesives because these polymers degrade under prolonged exposure to oxygen or sunlight. Efforts to extend acrylic adhesive technology from solvent to hot melt processing have had only limited success. The commercially available acrylic HMPSA have relatively low cohesive strength and therefore can only be used in applications in which holding power requirements are minimal. It is possible to formulate weather resistant HMPSA based on a saturated thermoplastic rubber such as a hydrogenated styrene-butadiene-styrene block copolymer. However, the polymers which are commercially available are relatively stiff and therefore a fairly high level of plasticizer is required in the formulation to obtain good tack. Although a high level of plasticizer enhances tack, it also reduces holding power. Thus, a weather resistant HMPSA based on a saturated thermoplastic rubber/resin/plasticizer blend can only be used in applications in which holding power requirements are low.

To date, no material has been available for use in developing HMPSA which have the tack and holding power to meet the wide range of requirements for weather resistant PSA tapes and labels. A new saturated thermoplastic rubber has been developed to fill this need. The characteristics of this polymer and its use to expand the capability of hot melt coated adhesives are the subject of this invention.

SUMMARY OF THE INVENTION

The present invention broadly comprises a weatherable pressure sensitive adhesive composition possessing excellent tack, excellent holding power, reduced viscosity, and good UV and oxidative stability. The adhesive comprises:
(a) 100 parts by weight of a block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A and A' blocks are between about 3,000 and about 7,000 and the monoalkenyl arene content of the multiblock copolymer is between about 7% and about 22% by weight:
(b) about 50 to about 350 parts by weight of an adhesion-promoting resin compatible with block B; and
(c) about 0 to about 100 parts by weight of a plasticizer.

The two most critical characteristics of the multiblock copolymer component is the relatively narrow range of molecular weight for the A block and the monoalkenyl arene content. It is very important that the multiblock copolymer have an A block content of about 7 to 22% by weight and a molecular weight of between about 3,000 and about 7,000.

Additional components may be present in the adhesive compositions including, among others, antioxidants, fillers, UV stabilizers and end block (A or A') compatible resins.

DETAILED DESCRIPTION OF THE INVENTION

The term "block copolymer component" comprises the combination of a multiblock copolymer, as hereinafter defined, and an A'B' two block copolymer. The weight ratio of the multiblock copolymer to the A'B' two block copolymer is about 100:0 to about 25:75, preferably about 80:20 to about 40:60.

The multiblock copolymers employed in the present invention may have a variety of geometrical structures, since the invention does not depend on any specific geometrical structure, but rather upon the chemical constitution of each of the polymer blocks. Thus, the structures may be linear, radial or branched so long as each multiblock copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with coupling agents such as mono or dihaloalkanes or -alkenes and divinyl benzenes as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alphamethylstyrene) and
poly(alpha-methylstyrene)-polyisoprene-poly(alphamethylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alphamethylstyrene and ring-substituted styrenes, particularly ring-methylated styrenes. The preferred monoalkenyl arenes are styrene and alphamethylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 65 mol percent of the condensed butadiene units in the butadiene polymer block have 1,2-configuration, as measured by a standard NMR technique. Thus, when such a block is hydrogenated, the resulting product is, or resembles, a regular copolymer block of ethylene and butene-1 (EB). Most preferably, the 1,2 content is about 50%. If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks are very important aspects of the present invention and may vary only within certain limits. In most instances, the monoalkenyl arene blocks will have number average molecular weights in the order of 3,000 to 7,000, preferably about 5,000 while the conjugated diene blocks either before or after hydrogenation will have average molecular weights in the order of 30,000 to 500,000, preferably 40,000 to 500,000. The total average molecular weight of the multiblock copolymer is typically in the order of 35,000 to about 500,000, preferably from about 45,000 to about 400,000, and depends upon geometry of the polymer. These molecular weights are most accurately determined by tritium counting methods or osmotic pressure measurements. The diene block molecular weight is effectively set by the limitations on monoalkenyl arene block molecular weight and the weight percentage of monoalkenyl arene along with the geometry of the copolymer.

The proportion of the monoalkenyl arene blocks should be between about 7 and 22% by weight of the multiblock copolymer, preferably between about 10 and 18% by weight.

The chemical composition and molecular weight ranges of the A' and B' blocks of the A'B' two block copolymer are typically the same as the A and B blocks of the multiblock copolymer. The A'B' two block copolymer may be prepared in a separate synthesis process or may be prepared along with the multiblock copolymer by controlling coupling efficiency. The control of coupling efficiency is disclosed in U.S. Pat. No. 4,096,203. The A'B' two block copolymer is useful in reducing the overall viscosity of the adhesive composition along with improving the tack.

The block copolymer component by itself lacks the required adhesion. Therefore, it is necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl-2-butene and about 10% dimer. See U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 40° C. and about 115° C. Other adhesion promoting resins which are also useful in the compositions of this invention include hydrogenated resins, esters of rosins, polyterpenes, terpenephenol resins, and polymerized mixed olefins. For best UV resistance, it is preferred that the tackifying resin be a saturated resin, e.g., a hydrogenated dicyclopentadiene resin such as Escorez 5380 resin made by EXXON or a hydrogenated polystyrene or polyalphamethylstyrene resin such as XPS 657 resin made by Hercules.

The amount of adhesion promoting resin employed varies from about 50 to about 350 parts by weight per hundred parts rubber (phr), preferably between about 80 to about 250 phr.

The adhesive compositions of the instant invention also may contain plasticizers such as rubber extending or compounding oils or liquid resins. These rubber compounding oils are well-known in the art and include both high saturates content and high aromatics content oils. Preferred plasticizers are highly saturated oils. The amount of rubber compounding oil employed varies from 0 to about 100 phr, preferably about 10 to about 60 phr.

Optionally, an arene-block-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of arene block-compatible resins having high and low softening points may also be used. Useful resins include coumaroneindene resins, polystyrene resins, vinyl toluene-alphamethylstyrene copolymers, and polyindene resins. Much preferred is a coumarone-indene resin. The amount of arene-block-compatible resin varies from 0 to about 200 phr.

The compositions of this invention may be modified with supplementary materials including pigments, fillers, and the like as well as stabilizers and oxidation inhibitors. Stabilizers and oxidation inhibitors are typically added to the commercially available compounds in order to protect the polymers against degradation during preparation and use of the adhesive composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:

1. Benzothiazoles, such as 2-(dialkyl-hydroxybenzyl-thio)benzothiazoles.
2. Esters of hydroxybenzyl alcohols, such as benzoates, phthalates, stearates, adipates or acrylates of 3,5-dialkyl-1-hydroxybenzyl alcohols.
3. Stannous phenyl catecholates.
4. Zinc dialkyl dithiocarbanates.
5. Alkyl phenols, e.g., 2,6-di-tert-butyl-4-methyl phenol.
6. Dilaurylthio-dipropionate.

Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di-(t-butyl)-p-cresol, "Naugawhite" alkylated bisphenol, "Butyl Zimate" zinc dibutyl dithiocarbamate, and "Agerite Geltrol" alkylated-arylated bis-phenolic phosphite. From about 0.01 percent to about 5.0 percent by weight of one or more antioxidants is generally added to the hot-melt adhesive composition.

The adhesive compositions of the present invention may be prepared by either blending block copolymer, oil and tackifying resin in a solvent, such as toluene, and removing the solvent by a stripping operation or they may be prepared by merely mixing the components at an elevated temperature, e.g. at about 150° C. (hot melt). In addition, if desired, the adhesive compositions may be cured, for example, by known irradiation techniques.

A preferred use of the present invention is in the preparation of pressure-sensitive adhesives tapes by a method such as that disclosed in U.S. Pat. No. 3,676,202 or in the manufacture of labels. The pressure-sensitive adhesive tape comprises a flexible backing sheet and a layer of the pressure-sensitive adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

The invention is further illustrated by means of the following illustrative embodiments, which are given for the purposes of illustration only and are not meant to limit the invention to the particular reactants and amounts disclosed.

Various standard tests are employed to measure the adhesive and cohesive characteristics of the adhesive compositions. Among these tests are Rolling Ball Tack, Pressure Sensitive Tape Council (PSTC) method PSTC 6; Polyken Probe Tack, ASTM D-2979; 180° Peel, PSTC 1; Quick Stick to Steel and Kraft Paper, PSTC 5; and Holding Power to Steel and Kraft Paper, PSTC 7.

ILLUSTRATIVE EMBODIMENT I

Comparison of HMPSA Based on Thermoplastic Rubber

The properties of HMPSA are strongly influenced by the structure of the thermoplastic rubber as well as by the type and concentration of resin and plasticizer. The thermoplastic rubbers most widely used in HMPSA are the polystyrene-polyisoprene-polystyrene (S-I-S) polymers. Commercial S-I-S polymers typically contain about 15%w styrene and are relatively soft, low modulus polymers. When combined with tackifying resin, these polymers give excellent tack even without the need for plasticizer in the formulation. This is demonstrated by the data in Table 1 for the two formulations containing the S-I-S polymer, KRATON D 1107 Rubber. The plasticizer free Formulation A has excellent tack, holding power and service temperature but rather high melt viscosity. The Formulation D containing plasticizer also has excellent tack and lower melt viscosity but it also has lower service temperature and much lower holding power. Thus, the soft S-I-S polymers can be used by the adhesive formulator to achieve the tack and holding power required in a wide range of applications. However, as will be shown below, the unsaturated S-I-S polymers cannot be used in weather resistant adhesives because the polymers degrade when exposed to sunlight.

Saturated thermoplastic rubbers are the polystyrene-poly(ethylene/butylene)-polystyrene (S-EB-S) polymers. Since the midblock of these polymers is saturated, the polymers have excellent stability and are candidates for use in weather resistant HMPSA. However, commercial S-EB-S polymers, such as KRATON ® G 1652 Rubber, typically contain 30%w styrene. These polymers are relatively hard, high modulus polymers which are more difficult to tackify than are the soft S-I-S polymers. As shown in Table 1, the plasticizer free Formulation B based on KRATON G 1652 Rubber has practically no tack and has very high melt viscosity. The Formulation E containing plasticizer has fair tack and moderate melt viscosity but very poor holding power. Thus, commercial saturated thermoplastic rubbers offer the adhesive formulator the ability to formulate HMPSA which have good tack but only low holding power.

A new saturated thermoplastic rubber, KRATON GX 1657 Rubber, has been developed for use by the adhesive formulator. This new polymer contains only about 15%w styrene and therefore is a softer, lower modulus polymer than commercial saturated thermoplastic rubbers. As shown in Table 1, the holding power, service temperature and melt viscosity of Formulations C and F based on KRATON GX 1657 Rubber are comparable to those of adhesives based on the widely used KRATON D 1107 Rubber. With presently available resins, the tack of PSA based on KRATON GX 1657 rubber is much improved over the tack of PSA based on KRATON G 1652 Rubber. Thus, KRATON GX 1657 Rubber offers the adhesive formulator much more capability to formulate weather resistant HMPSA which have the tack and holding power required in a wide range of applications.

In the various formulations, the following components are employed:

| Name | Description |
| --- | --- |
| KRATON® GX 1657 Rubber | A selectively hydrogenated styrene-butadiene-styrene/styrene-butadiene block copolymer component according to the present invention, having a styrene content of about 15 percent. |
| KRATON® G 1652 Rubber | A polymer similar in structure to KRATON GX 1657, but with styrene block molecular weights greater than claimed herein and a styrene content of about 30 percent. |
| KRATON® D 1107 Rubber | A non-hydrogenated styrene-isoprene-styrene block copolymer. |
| Escorez 5380 Resin | A hydrogenated dicyclopentadiene tackifying resin from Exxon Chemical. |
| Arkon P85 Resin | A hydrogenated alicylic hydrocarbon tackifying resin from Arakawa Chemical Industries, Inc. |
| Tufflo 6056 | A rubber plasticizer oil from Atlantic Richfield Company |
| Irganox 1010 | Tetrakis [methylene 3-(3', 5'-di-tert-butyl-4'-hydroxyphenyl) proprionate] methane from Ciba-Geigy |
| Tinuvin 327 | Substituted hydroxyphenyl benzotriazole from Ciba-Geigy Co. |

TABLE 1

| | Properties of HMPSA Based on Thermoplastic Rubbers | | | | | |
| --- | --- | --- | --- | --- | --- | --- |
| Formulation[a]: | A | B | C | D | E | F |
| Base Rubber[b]: | D1107 | G1652 | GX1657 | D1107 | G1652 | GX1657 |
| Properties | | | | | | |
| POLYKEN® Probe Tack[c], Kg | 0.9 | 0.1 | 0.5 | 1.0 | 0.6 | 0.9 |
| Loop Tack[d], N/M | 710 | 50 | 400 | 980 | 620 | 800 |
| Holding Power[e], Hrs | >80 | >80 | 67 | 1.1 | 0.1 | 2.5 |
| Service Temperature[f], °C. | 96 | 121 | 95 | 84 | 100 | 80 |
| Melt Viscosity[g], Pa · S | 250 | >2000 | 300 | 40 | 70 | 60 |

[a]Formulations A-C contain Rubber, 80 phr ESCOREZ 5380; Formulations D-F contain Rubber, 125 phr ARKON P85, 25 phr TUFFLO 6056. All formulations contain 1 phr IRGANOX 1010 and 0.25 phr TINUVIN 327.
[b]D1107, G1652 and GX1657 represent KRATON® D1107, G1652 and GX1657 Rubbers, respectively.
[c]ASTM D-2979, 1 cm/sec probe speed, 100 g/cm² probe pressure, 1 sec dwell time.
[d]Measured with TLMI Loop Tack Tester, Model No. 80-16.
[e]PSTC Method No. 7, 13 × 13 mm contact area to kraft paper, 2 Kg load.
[f]Temperature at which 25 × 25 mm lap shear bond to MYLAR fails under a 1 Kg load in a cabinet whose temperature is raised at 22° C./hr.
[g]Viscosity at 177° C. in Brookfield RVT with No. 29 spindle (ASTM D-3236).

ILLUSTRATIVE EMBODIMENT II

UV Resistance

There are many requirements on the resistance of weatherable PSA tapes to degradation, the requirements being dictated by the intended use of the tape. One common use of a weather resistant tape is to adhere something, a poster for example, on the inside of a window. The requirements are that the tape, exposed to sunlight through the window, must hold the poster in place for the desired length of time and, when the poster is removed, the tape should peel cleanly leaving no adhesive residue on the glass. The resistance to degradation was determined on a series of tapes in a test designed to simulate this type of application.

Two experimental tapes were prepared for testing by casting the adhesives on polyester backing. One of the adhesives was based on the unsaturated S-I-S polymer, KRATON D 1107 Rubber, the other on the saturated S-EB-S polymer, KRATON GX 1657 Rubber, according to the present invention. Two commercial acrylic adhesive tapes, indicated by their manufacturer to be weather resistant tapes, were also tested. 180° peel adhesion test samples were prepared by applying the tapes to 6.4 mm thick plate glass. Beginning in June, 1979, the 180° peel test samples were aged outside in Houston, Texas, on a stand facing south and with the samples at a 45° angle to the ground. The samples were placed with the glass side facing the sun so the sunlight passed through the glass before striking the adhesive. 180° peel strength (the force required to peel the tape from the glass) was measured after exposure for various periods of time. Results are shown in Table 2.

Before aging, Experimental Tape A, based on the unsaturated S-I-S polymer, could be removed cleanly from the glass at a peel strength of 770 N/m. After only two weeks exposure to sunlight, Tape A gave an erratic peel alternating from an adhesive failure at 1000 N/m to a cohesive failure at 2300 N/m. As exposure continued, the failure mechanism continued to be cohesive and the peel strengths became lower and lower as the cohesive strength of the adhesive was further reduced by degradation. The peel strength of Experimental Tape B, based on the saturated S-EB-S polymer, increased somewhat during the first three months of exposure but the tape always peeled cleanly from the glass. During the attempt to measure peel strength after six months exposure, the polyester backing broke. After one month exposure, the peel strength of Commercial Tape C dropped somewhat from its initial peel strength but still peeled cleanly from the glass. After three months exposure, the backing of Tape C broke during the attempt to measure its peel strength. The peel strength of Commercial Tape D first increased and then decreased during the first three months of exposure. After six months exposure, Tape D failed cohesively leaving a heavy adhesive residue on the glass when the tape was removed.

Results of these tests give an indication of the resistance of these adhesive tapes to degradation when exposed to sunlight through window glass. The adhesives on Experimental Tape A and on the weather resistant Commercial Tape D failed in less than two weeks and between three to six months, respectively, because an adhesive residue was left on the glass when the tape was removed. Experimental Tape B failed between three to six months and the weather resistant Commercial Tape C failed between one to three months because the tape backing broke when the attempt was made to remove the tape. It can be concluded that, in this particular test, the weather resistance of the adhesive based on the saturated KRATON GX 1657 Rubber (according to the present invention) is much better than that of the adhesive based on the unsaturated KRATON D 1107 Rubber and is comparable to that of commercial weather resistant tapes based on acrylics.

TABLE 2

PSA Resistance to Sunlight[a]
180° Peel Strength on Glass[b], N/M

| | Experimental HMPSA Tapes | | Commercial Weatherable Tapes | |
|---|---|---|---|---|
| | A[c] | B[c] | C | D |
| Adhesive Base Rubber: | S-I-S | S-EB-S | Acrylic | Acrylic |
| Exposure Time, Months | | | | |
| 0 | 770 ad | 530 ad | 860 ad | 630 ad |
| 0.5 | 1000 ad −2300 co | 540 ad | 560 ad | 840 ad |
| 1 | 1300 co | 610 ad | 560 ad | 740 ad |
| 3 | 820 co | 860 ad | Tore | 420 ad |
| 6 | 230 co | Tore | Tore | 460 co |

[a] 180° peel adhesion test samples of tape adhered to window glass were prepared and exposed to Houston sunlight beginning in June 1979. Samples faced south, tilted at 45° angle, with glass side facing sun.
[b] 180° peel adhesion (PSTC Method No. 1) vs. exposure time was measured. Letters ad and co after the peel strength value indicate adhesive failure and cohesive failure, respectively. Tore means the tape backing broke during the attempt to measure peel strength.
[c] Adhesives A and B contained KRATON® D1107 and GX1657 Rubbers, respectively. Both adhesives also contained 80 phr of ARKON P85, 1 phr IRGANOX 1010 and 0.25 phr TINUVIN 327. Adhesives were cast on 25 μm polyester at 35 μm adhesive thickness.

ILLUSTRATIVE EMBODIMENT III

Oxidation Resistance

Resistance of a PSA to degradation by oxidation throughout the intended service life of the product is a very important performance consideration. If the oxidation resistance is poor, the product may lose its properties during storage before use or it may fail prematurely in the customer's application. Satisfactory oxidation resistance is assured by selecting adhesive components whose stability is tailored to the end use requirements of the product and by including oxidation inhibitors in the formulation.

There is an additional requirement on oxidation resistance of HMPSA since degradation may also occur during hot melt mixing and coating. It has been shown that minimizing oxidative degradation during hot melt processing of HMPSA based on the unsaturated S-I-S polymers is critical to the production of satisfactory HMPSA products. Significant degradation can occur within several hours if hot melt processing of HMPSA based on an S-I-S polymer is done without the protection of an inert gas blanket. Degradation of the S-I-S polymer in the adhesive causes a reduction in the cohesive strength, melt viscosity and holding power of the adhesive. Degradation of the S-I-S polymer in the HMPSA can be readily controlled by excluding air with an inert gas blanket and by minimizing residence times of the hot adhesive in mixing and coating equipment.

It could be expected that potential problems associated with degradation during hot melt processing of HMPSA based on the standard S-EB-S polymers would be much less severe than when processing HMPSA based on an unsaturated S-I-S polymer. A test is being developed by the ASTM to compare the relative stability during processing of hot melt adhesives. In this test, 250 ml beakers containing 150 grams of adhesive are placed in a recirculating air oven at the required temperature. A HMPSA based on KRATON GX 1657 Rubber was run in this test. Four beakers of adhesive were placed uncovered in the oven at 177° C. Samples were taken after 0, 1, 2, 4 and 7 days in the oven. Samples were checked for skin and char formation on the surface of the adhesive, and for color and melt viscosity changes. The samples were then dissolved in toluene and cast on polyester film for adhesive property measurements. Results are shown in Table 3.

The performance of the adhesive shown in Table 3 in this test is considered excellent. Even after exposure to air for a week at 177° C., the adhesive showed no significant viscosity change and formed no skin or char at all on the surface. Gel Permeation Chromatography analysis showed that the polymer in the adhesive after 7 days at 177° C. underwent no change in molecular weight distribution. The adhesive properties of the sample aged for 7 days at 177° C. are essentially the same as those of the unaged adhesive. The only significant change caused by heat aging the adhesive in air is that the adhesive color changed from practically water white to a tan color. It is likely that the color change can be minimized by processing under an inert gas blanket and by minimizing residence times in the hot melt processing equipment. Further improvement in color change may also be possible by using more stable resins and a more effective stabilizer package.

The treatment the adhesive received in this oven aging test is significantly different than the treatment it would receive in commercial mixing and coating equipment. Nonetheless, the behavior of the adhesive in this oven aging test strongly suggests that its potential for degradation during processing will be greatly diminished when compared with HMPSA based on unsaturated S-I-S polymers.

TABLE 3

Oxidation Resistance of HMPSA[a] During Hot Melt Processing

| | Properties After Aging[b] for Time, t (days) | | | | |
|---|---|---|---|---|---|
| Property | t = 0 | t = 1 | t = 2 | t = 4 | t = 7 |
| Skinning[c] | None | None | None | None | None |
| Melt Viscosity[d], Pa · s | 43 | 41 | 42 | 42 | 43 |
| Gardner Color[e] | 1 | 3 | 4 | 5 | 6 |
| POLYKEN® Probe Tack[d], Kg | 0.85 | — | 0.65 | — | 0.75 |
| Loop Tack[d], N/M | 840 | — | 780 | — | 650 |
| Holding Power[d], Hrs. | 5 | — | 6 | — | 4 |
| Service Temperature[d], °C. | 80 | — | 82 | — | 82 |

[a] Adhesive, mixed in sigma blade mixer, contained KRATON® GX1657 Rubber, 115 phr of XPS 657, 15 phr of TUFFLO 6056, 1 phr of IRGANOX 1010 and 0.25 phr TINUVIN 327.
[b] 150 gms adhesive in 250 ml beakers aged uncovered in air recirculating oven at 177° C.
[c] Qualitative rating of tough skin on surface of adhesive.
[d] See Table I footnotes for test methods. Holding power in this table is to steel rather than paper.
[e] Color of 50% w solution of adhesive in toluene compared to Gardner color standards.

ILLUSTRATIVE EMBODIMENT IV

Comparison of Weather Resistant HMPSA

Two HMPSA candidates to replace solvent coated acrylic PSA in weather resistant tapes are acrylic HMPSA and HMPSA based on a saturated thermoplastic rubber. A comparison of the properties of these two types of adhesives is shown in Table 4, along with data on two commercial weather resistant tapes.

The acrylic HMPSA, Sample A in Table 4, has very good tack, even better tack than the two commercial tapes, Samples D and E in Table 4. However, the cohesive strength of the acrylic HMPSA is low. This is reflected in the cohesive failure mechanism at a very short time in the holding power test and by the relatively low upper service temperature. These data suggest that the acrylic HMPSA cannot be used in PSA tape applications, in which fairly high holding power is required, but that it may perform satisfactorily in PSA label applications, in which only low holding power is required.

Two examples of experimental HMPSA based on the saturated thermoplastic rubber, KRATON GX 1657 Rubber, are given in Table 4. Sample B has a melt viscosity somewhat higher than that of the acrylic HMPSA while Sample C is somewhat lower. Sample B is an example of a HMPSA for tape applications. This adhesive has excellent holding power and an upper service temperature comparable to that of the commercial tapes. Sample C is an example of a HMPSA for label applications in which the holding power and upper service temperature requirements are lower than for tapes.

TABLE 4

Properties of Weather Resistant PSA Tapes

| Tape: | A | B[a] | C[a] | D | E |
|---|---|---|---|---|---|
| Identification: | Commercial Acrylic HMPSA | Experimental Rubber/Resin HMPSA | Experimental Rubber/Resin HMPSA | Commercial Acrylic Tape | Commercial Acrylic Tape |
| Properties[b] | | | | | |
| POLYKEN ® Probe Tack, Kg | 1.0 | 0.7 | 0.4 | 0.4 | 0.9 |
| Loop Tack, N/M | 550 | 650 | 610 | 170 | 440 |
| 180° Peel[c], N/M | 330 | 530 | 330 | 370 | 460 |
| Holding Power, hr. | 0.2[d] | >60 | 1.0 | 1.3 | 0.8 |
| Service Temperature, °C. | 69 | 83 | 72 | 95 | 86 |
| Melt Viscosity, Pa · S | 40 | 60 | 25 | — | — |

[a]Adhesive on Tape B contained KRATON ® GX1657 Rubber, 115 phr ARKON P85 and 15 phr TUFFLO 6056. Adhesive on Tape C contained KRATON ® GX1657 Rubber, 125 phr ARKON P85 and 50 phr TUFFLO 6056. Both adhesives also contained 1 phr IRGANOX 1010 and 0.25 phr TINUVIN 327.
[b]See Table I footnotes for test methods. Holding power in this table is to steel rather than paper.
[c]PSTC Method No. 1.
[d]Cohesive failure.

What is claimed is:

1. A weather resistant pressure sensitive adhesive composition possessing excellent oxidative and UV stability along with improved tack and reduced melt viscosity comprising:
   (a) 100 parts by weight of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000, the monoalkenyl arene content of the multiblock copolymer is between about 7% and about 22% by weight and the weight ratio between the A'B' block copolymer and the multiblock copolymer is about 0:100 to about 75:25;
   (b) about 50 to about 350 parts by weight of a tackifying resin compatible with block B; and
   (c) about 0 to about 100 parts by weight of a plasticizer.

2. A composition according to claim 1 wherein the weight ratio between the A'B' block copolymer and the multiblock copolymer is between about 20:80 to about 60:40.

3. A composition according to claim 1 wherein said monoalkenyl arene is styrene and said conjugated diene is butadiene.

4. A composition according to claim 1 wherein said multiblock copolymer is a selectively hydrogenated linear polystyrene-polybutadiene-polystyrene block copolymer.

5. A composition according to claim 4 wherein said A'B' block copolymer is a selectively hydrogenated polystyrene-polybutadiene block copolymer.

6. A composition according to claim 4 wherein said A'B' block copolymer is a selectively hydrogenated polystyrene-polyisoprene block copolymer.

7. A composition according to claim 1 wherein said multiblock copolymer is a selectively hydrogenated polystyrene-polyisoprene-polystyrene block copolymer.

8. A composition according to claim 3 wherein said butadiene block has a 1,2 configuration of between about 35 and 65 mol percent.

9. A composition according to claim 1 wherein said tackifying resin is a saturated resin.

10. A composition according to claim 9 wherein said tackifying resin is a hydrogenated dicyclopentadiene resin.

11. A composition according to claim 9 wherein said tackifying resin is a hydrogenated aromatic hydrocarbon resin.

12. A composition according to claim 1 including between 0 and 200 parts by weight of an A block compatible resin.

13. A composition according to claim 1 wherein no more than about 25 percent of the alkenyl arene aromatic double bonds in said A and A' blocks are hydrogenated.

* * * * *